United States Patent
Kato

[11] Patent Number: 5,262,069
[45] Date of Patent: Nov. 16, 1993

[54] FILTER CAKE SCRAPING METHOD AND ROTARY DRUM FILTER USING THE SAME

[75] Inventor: Sakae Kato, Tokai, Japan

[73] Assignee: FSK, Inc., Aichi, Japan

[21] Appl. No.: 831,180

[22] Filed: Feb. 5, 1992

[30] Foreign Application Priority Data

Feb. 16, 1991 [JP] Japan .................... 3-44249
Jun. 25, 1991 [JP] Japan ................ 3-57277[U]

[51] Int. Cl.[5] ............... B01D 37/02; B01D 21/02
[52] U.S. Cl. .................... 210/777; 210/784; 210/791; 210/402; 210/408
[58] Field of Search ......... 210/777, 784, 791, 808, 210/402, 408

[56] References Cited

U.S. PATENT DOCUMENTS

| | | | |
|---|---|---|---|
| 2,652,929 | 9/1953 | Aagaard et al. | 210/201 |
| 3,520,410 | 7/1970 | Hutto, Jr. | 210/784 |
| 3,616,908 | 11/1971 | Rokytansky | 210/784 |
| 3,869,389 | 3/1975 | Rokytansky | 210/784 |
| 3,919,088 | 11/1975 | Doncer et al. | 210/408 |
| 4,226,716 | 10/1980 | White, Jr. | 210/408 |
| 4,895,647 | 1/1990 | Uchiyama | 210/408 |
| 5,078,878 | 1/1992 | Charette | 210/408 |

FOREIGN PATENT DOCUMENTS

| | | | |
|---|---|---|---|
| 0078243 | 5/1983 | European Pat. Off. | 210/408 |
| 710492 | 7/1937 | Fed. Rep. of Germany . | |
| 3048975 | 7/1982 | Fed. Rep. of Germany . | |
| 2384530 | 10/1978 | France . | |
| 2019222 | 1/1987 | Japan | 210/784 |
| 2059712 | 3/1987 | Japan | 210/408 |
| 2163720 | 7/1987 | Japan | 210/784 |
| 3091112 | 4/1988 | Japan | 210/784 |

Primary Examiner—Robert A. Dawson
Assistant Examiner—Ana M. Fortuna
Attorney, Agent, or Firm—Frishauf, Holtz, Goodman & Woodward

[57] ABSTRACT

Disclosed are a filter cake scraping method which can scrape a filter cake layer deposited on the surface of a filter drum with a scrape blade even if the particles of the cake are fine, and a rotary drum filter using this method. When pressure inside a suspension vessel rises above a predetermined value, a control means quickly reduces the pressure. Accordingly, precoated material or the like, which has been deposited on the filter drum, expands to push a layer of filter cake outward, thus permitting a scrape blade provided beside the filter drum to scrape the expanded cake layer.

32 Claims, 5 Drawing Sheets

FILTER CAKE SCRAPING METHOD AND ROTARY DRUM FILTER USING THE SAME

BACKGROUND OF THE INVENTION

The present invention relates to a method for scraping filter cake and a rotary drum type filter using this method. More particularly, the present invention relates to a method for scraping filter cake by expanding the same and a rotary drum type filter equipped with a means for expanding the filter cake and a mechanism for scraping it.

In general, a rotary drum type filter, which is equipped with a rotary filter drum inside of its suspension vessel to filtrate the suspension through a filter medium laid on the surface of that drum or through a filter aid layer or a filter cake layer deposited on that filter medium, is widely known. A scrape blade with a sharp edge is provided beside the filter drum of such a rotary drum type filter. As the filter drum rotates, the scrape blade scrapes a sludge layer deposited on the surface of the filter medium of the filter drum.

In the case where the suspension to be filtered is a suspension which contains fine and hard particles such as a grinding fluid after use, however, the filter cake layer becomes stiff and hardened so that smooth scraping with the scrape blade is likely to be difficult. When pushing the scrape blade to the filter cake layer continuously, it is possible to scrape the layer little by little. But, the scrape blade gets worn so quickly that the filter operation is disturbed and the operating cost rises.

On the other hand, there is another method for scraping the filter cake layer by pushing the scrape blade into the layer only when a block of the filter occurs while keeping the blade away from the layer usually. However, this method involves the following two problems.

① When pushing the scrape blade into a hard filter cake layer forcibly, an overload of the blade feeding motor or the drum rotating motor occurs and this causes the operation of the filter to stop.

② The second problem arises even if the blade could be pushed into the filter cake layer. At the moment when the block is eliminated by the scraping, the filtration pressure decreases rapidly, which causes an expansion of the filter medium layer (if it is elastic) or a filter cake layer. As the result, the scrape blade would cut unnecessarily deep into the filter medium layer. This unnecessary deep cutting leads to a wear of the filter medium or an excessive scraping of the precoated filter aid layer. The latter results in a waste of filter aids and an increased frequency of precoating operation i.e. a drop of filtration efficiency. These results are greatly undesirable.

These problems are not peculiar only to rotary drum type filters. The developments of a method to facilitate the removal of filter cakes have been long-awaited in all fields of filtration technique. As for such method, there are given an ultrasonic method which loosens the filter cake layer by ultrasonic vibrations and a back-washing method which back-washes the filter medium using air or water. However, there are shortcomings in those methods. The ultrasonic method requires expensive and complicated equipment. The back-washing method also requires complicated equipment and operation, and at the same time, it requires time for back-washing so that the time efficiency of filtration drops.

SUMMARY OF THE INVENTION

It is therefore an object of the present invention to provide a filter cake scraping method which will overcome the above-described conventional shortcomings and can scrape efficiently a layer of filter cake deposited on the surface of a filter medium even if the particles of the suspension are fine and hard, and also to provide a rotary drum type filter using this method.

To achieve this object, there is provided a filter cake layer scraping method in a rotary drum type filter; wherein the filter comprises a rotary drum, a filter medium layer formed on an outer surface of the rotary drum and a scraper disposed outside and in the vicinity of the filter medium layer; which comprises:

(a) expanding a filter cake layer radially outward of the drum by an operation to rapidly reduce a pressure difference between a suspension side and a filtrate side of the filter medium layer, when the filter cake layer deposited on the filter medium layer becomes thick or when a filtration pressure loss reaches a predetermined value due to a block of the filter medium layer or the filter cake layer, and before a scraping operation; and subsequently, (b) scraping a portion of the filter cake layer which has come into contact with the scraper due to an expansion of the filter cake layer.

According to another aspect of the present invention, there is provided a rotary drum type filter for filtration of a suspension having a rotary drum, a filter medium layer formed on an outer surface of the rotary drum and a scraper disposed outside of the filter medium layer; further comprising a control means to execute an operation to rapidly reduce a pressure difference between a suspension side and a filtrate side of the filter medium layer when the filter cake layer deposited on the filter medium layer becomes thick or when a filtration pressure loss reaches a predetermined value due to a block of the filter medium layer or the filter cake layer; whereby expanding a filter cake layer radially outward of the drum and scraping a portion of the filter cake layer which has come into contact with the scraper due to an expansion of the filter cake layer.

According to another aspect of the present invention, there is provided a filter cake scraping method which comprises the steps of rapidly reducing internal pressure of a suspension vessel to expand a filter cake layer when the filter cake layer deposited on a filter drum that is provided in the suspension vessel becomes thick; and scraping the filter cake with a scrape blade provided beside the filter drum.

According to another aspect of the present invention, there is provided a rotary drum type filter having a rotary filter drum retained in a suspension vessel, which comprises control means, connected to a system that supplies suspension to the suspension vessel or a system that discharges filter cake therefrom, for rapidly dropping pressure inside the suspension vessel at the time when the pressure rises above a predetermined value; and a scrape blade, provided beside the filter drum, for scraping a filter cake layer expanded due to reduction of the pressure.

According to another aspect of the present invention, there is provided a rotary drum type precoat filter having a rotary filter drum which has a layer of precoated filter material on it and is retained in a suspension vessel comprising: a control means for rapidly dropping pressure inside the suspension vessel at the time when a filter cake layer deposited on the precoated filter material becomes thick; and a scrape blade, provided beside the filter drum, for scraping the filter cake layer expanded due to reduction of the pressure; wherein the rotary filter drum contains a fluid permeable inner support barrel and an elastic porous outer barrel which is fitted on the outer surface of the inner support barrel. According to this embodiment, it is possible to scrape a thicker filter cake layer by one scraping operation due to an enlarged expansion of the filter cake layer as the pressure drops, thus decreasing the frequency of the scraping operation, and consequently, the filtering interval (time) can be extended.

DETAILED DESCRIPTION OF THE PREFERRED EMBODIMENT

A preferred embodiment of the present invention will now be described in detail referring to the accompanying drawings.

Figure 1:
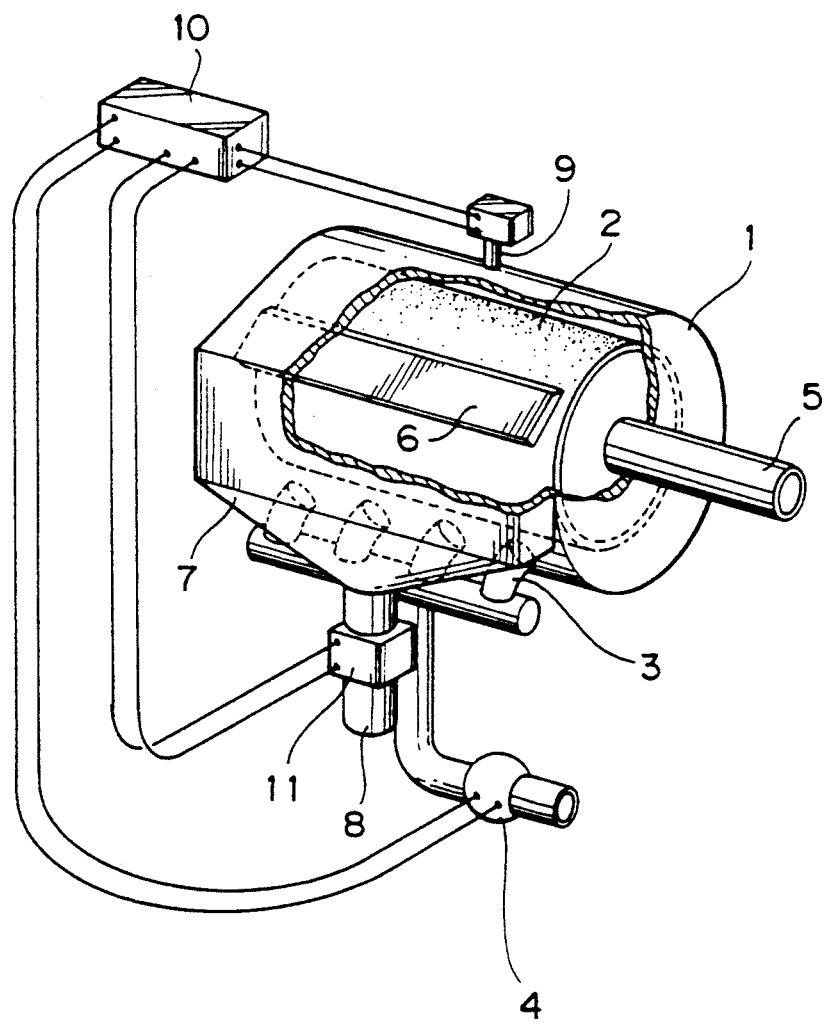
FIG. 1 is a partially cutaway perspective view of one embodiment of the filter of the present invention.

In FIG. 1, reference numeral 1 is a suspension vessel, 2 denotes a rotary filter drum furnished inside the vessel 1, and 3 denotes a tube to supply a suspension compressed by a pump 4 into the suspension vessel 1. A clarified filtrate outlet tube 5 is built into the rotation axis of the filter drum 2. The suspension is filtrated through a filter medium laid on the surface of the filter drum 2, and the filtrate flows out of the clarified filtrate outlet tube 5. Reference numeral 6 is a scrape blade which is placed, slanted, beside the filter drum 2. A filter cake hopper 7 for collecting the scraped cakes and a filter cake outlet tube 8 are provided outward of the blade 6.

According to this embodiment, there is a pressure gauge 9 disposed inside the suspension vessel 1, and the internal pressure of the vessel 1 measured with the pressure gauge 9 is supplied to a controller 10. The controller 10 promptly acts to reduce the pressure inside the suspension vessel 1 when the pressure exceeds a predetermined value. To carry out this task, the controller 10 may only send a signal to the pump 4 connected to the suspension supply tube 3 to decrease the number of rotations, or open a valve 11 of the filter cake outlet tube 8.

Figure 2:
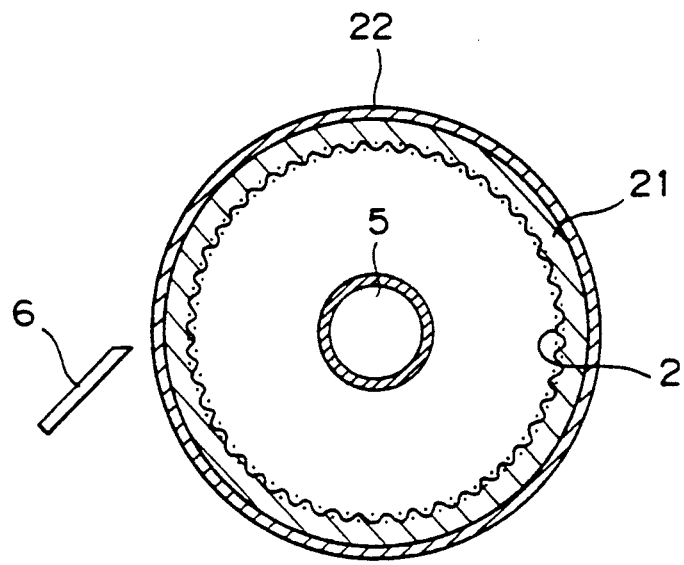
FIG. 2 is a cross section illustrating a filter drum under a normal filtration pressure.

According to the thus constituted rotary drum type filter of the present invention, while there is a little amount of filter cake deposited on the surface of the filter medium of the filter drum 2, the pressure inside the suspension vessel 1 is kept normal, thus permitting filtration to progress in the same manner as done in the conventional filter, as shown in FIG. 2, wherein reference numeral 21 is a precoated layer of filter material and 22 is a filter cake layer deposited on the precoated layer.

Figure 3:
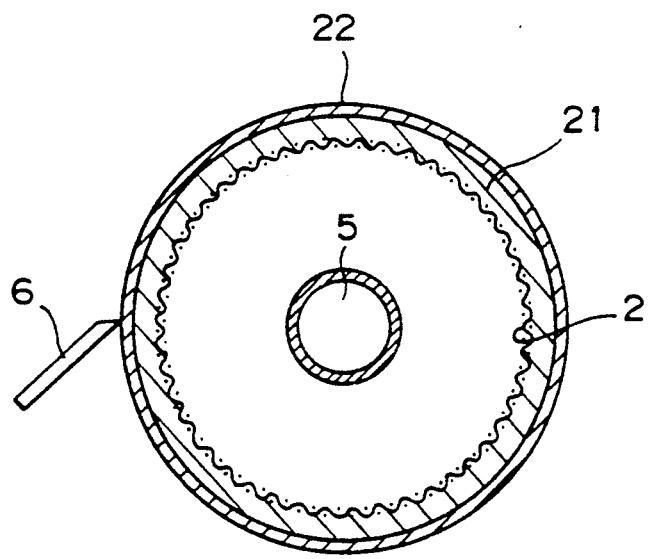
FIG. 3 is a cross section illustrating the filter drum when the filtration pressure has reached a predetermined value.
Figure 4:
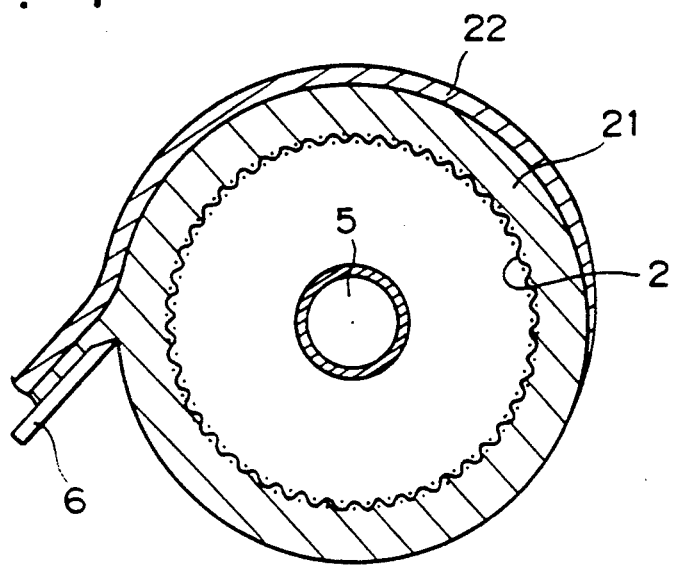
FIG. 4 is a cross section illustrating the filter drum when the filtration pressure is dropped by the intentional operation according to the present invention.

However, as the amount of the deposited filter cake increases, the pressure loss of the filter drum 2 increases, and the internal pressure of the suspension vessel 1 gradually rises. FIG. 3 shows such a state. When the internal pressure of the suspension vessel 1 exceeds a predetermined value, the pressure gauge 9 detects it. As a result, the controller 10 supplies a signal to the pump 4 to reduce the number of rotations or to open the valve 11 of the filter cake outlet tube 8, rapidly reducing the pressure in the suspension vessel 1. The pressure reduction causes a layer of precoated material 21 or a filter medium, attached on the surface of the filter drum 2, to expand outward together with the filter cake layer 22 as shown in FIG. 4. Accordingly, the edge of the scrape blade 6, provided beside the filter drum 2, cuts into the expanded filter cake layer 22, to scrape the cake from the surface of the drum 2. Precoated material, such as diatomaceous earth, may be scraped with the cake. However, it is preferable from an economical point of view that only the filter cake layer and blocked precoated layer are scraped by adjusting the position of the scrape blade. Even if the particles of the filter cake are fine and the cake layer 22 is stiff, the scrape blade 6 can smoothly scrape the cake layer 22, which has been pushed outward, bobbed up and become loose by the expansion. When the scraping is completed and the pressure inside the suspension vessel 1 drops down to a predetermined value, the controller 10 resets the pump 4 and the valve 11 to the initial statuses to start filtration again.

To expand the filter cake layer 22 outward more sufficiently, the filter drum 2 may be made of an elastic porous material, such as porous rubber or sponge, instead of a conventionally-used rigid material. This can ensure more complete scraping of sludge. It is also preferable that wood fibers or rubber powders are mixed within the precoat material in order to increase elasticity of the precoated layer thus assisting larger expansion of the filter cake layer and the filter medium layer due to the pressure change.

There is no limitation to the kind of a filter medium for the present invention Felt, filter paper or porous ceramics are given as examples. There is also no limitation to the material and shape of the scrape blade. Particularly for scraping a hard cake layer a plate made of cemented carbides or ceramics with a proper sharp edge formed on one end thereof is preferable. The position adjustment of the scrape blade tip may be determined properly according to the kind of the suspension and the filter medium and the size of the drum etc. It is also effective to use the feed operation of the scrape blade combined properly with the operation of the present invention, which comprises expansion of the filter cake layer and scraping thereof by controlling the pressure change.

There is also no limitation to the sort of suspension. For example, a grinding fluid for diamond wheels or ceramic bonded wheels and a grinding or cutting fluid for cemented carbides or hardened tool steels are given. One of the examples for raising the pressure of the filtrate side is to install a valve at the filtrate outlet tube 5 and close the opening of this valve.

Figure 5:
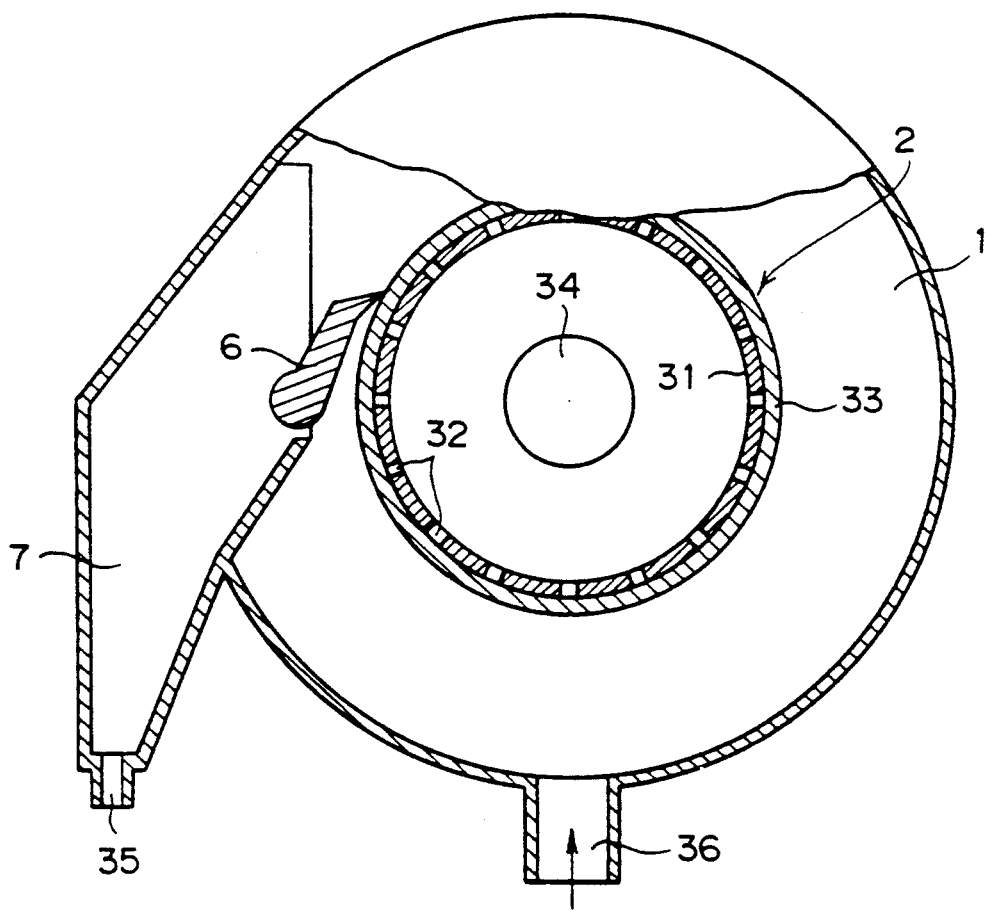
FIG. 5 is a cross section illustrating another embodiment of the filter of the present invention.
Figure 6:
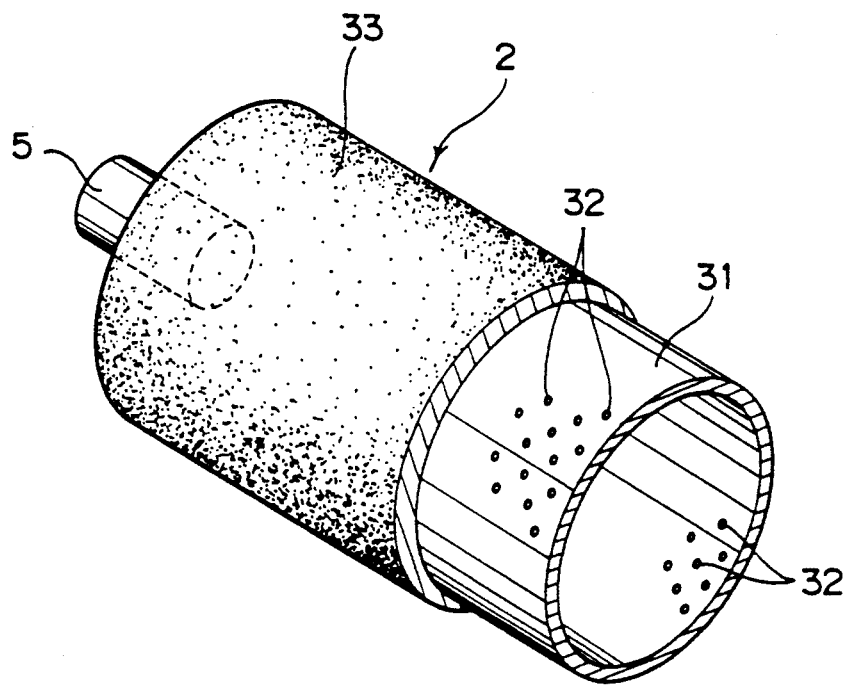
FIG. 6 is a partially cutaway perspective view of a filter drum of another embodiment.

In FIG. 5 and FIG. 6, reference numeral 1 is a suspension vessel, and in the vessel a precoat type rotatable filter drum 2 is provided. The filter drum 2 comprises a fluid permeable inner support barrel 31 which has a number of through holes 32 and an elastic and porous outer barrel 33 which is fitted on the outer surface of the inner support barrel. The filter drum also has a clarified filtrate outlet 34 at the center of one end.

The inner support barrel 31 may be made of stainless steel or fiber-reinforced-plastic with a number of through holes 32 or of porous ceramics, etc. Material of the inner support barrel 31 is not restricted to a specific one if it is strong enough as a structural material and permeable by fluid. The outer barrel may be made of an elastic porous material, such as felt, porous rubber or sponge rubber etc.

In the suspension vessel 1, there is provided a scrape blade 6 beside the filter drum 2, which scrapes filter cake and precoat material deposited on the surface of the filter drum 2 off into the filter cake hopper 7. Reference numeral 35 is a filter cake outlet formed at the bottom of the filter cake hopper, and 36 denotes a precoating fluid inlet.

In this preferred embodiment of the filter of the present invention, a typical operation is as follows: First, a precoating fluid is supplied from the precoating fluid inlet 36 into the suspension vessel 1 to form a precoated layer on the surface of the elastic outer barrel 33 of the filter drum 2. After the precoated layer is formed, suspension is supplied into the suspension vessel 1 and the suspension is filtrated by the precoated layer on the filter drum 2. Then, clarified filtrate in the filter drum drains to the outside from clarified filtrate outlet 34 provided at the center of one end of the filter drum.

As filtration proceeds and filter cake deposits on the precoated layer of the filter drum 2 in a certain amount the resistance to filtration becomes high, and supply of the suspension to the suspension vessel 1 is interrupted to reduce pressure in the suspension vessel rapidly. As a result, the pressure difference between the inside and the outside of the filter drum 2 becomes relatively lower and accordingly the outer barrel 33 made of elastic porous material and fitted on the outer surface of the inner support barrel expands. Simultaneous expansion of the filter cake layer causes the cake to be scraped off by the scrape blade 6. The scraped cake falls into the cake hopper and is excreted out from the cake outlet 35.

Figure 7:
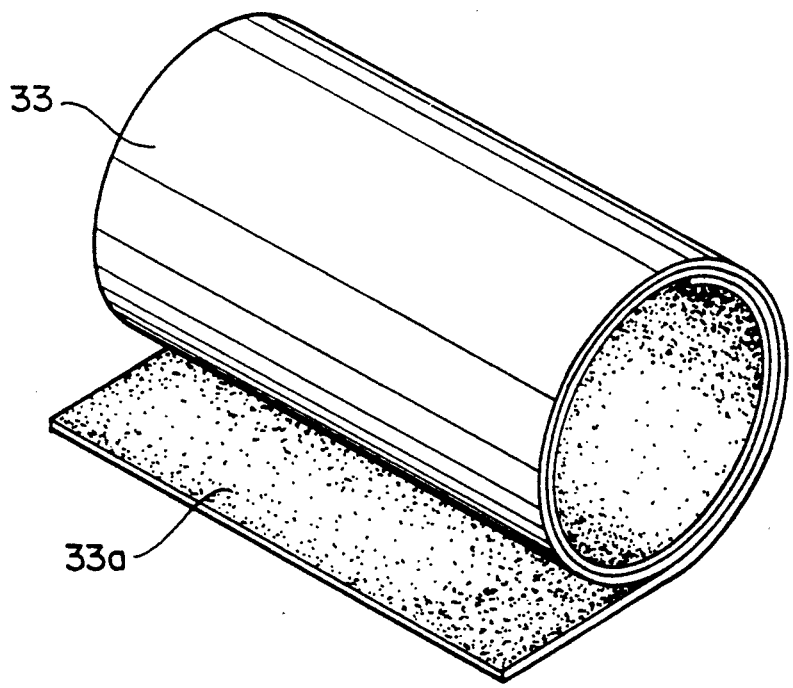
FIG. 7 is a perspective view of a filter drum of another embodiment.

FIG. 7 shows another preferred embodiment of the elastic outer barrel of the present invention. This outer barrel comprises one or plurality of felt sheets with one side thereof forming a raised surface and wound on the inner support barrel. The thickness of the felt sheet is for example 1.4-3 mm and 30-60% thereof is occupied by a raised portion. It is preferable that a plurality of felt sheets are wound because the expansion rate due to the pressure reduction becomes larger and the scraped thickness increases. However too many windings cause increased resistance of filteration. An optimum result was obtained by double winding of a 3 mm thickness felt sheet in the case where the diameter of the filter drum was 300 mm. The raised surface of the felt sheet can be inside or outside of the winding, although it is preferrable to wind so the raised surface is inside because elastic deformation as the pressure reduction increases and the scraping effect become larger.

Figure 8:
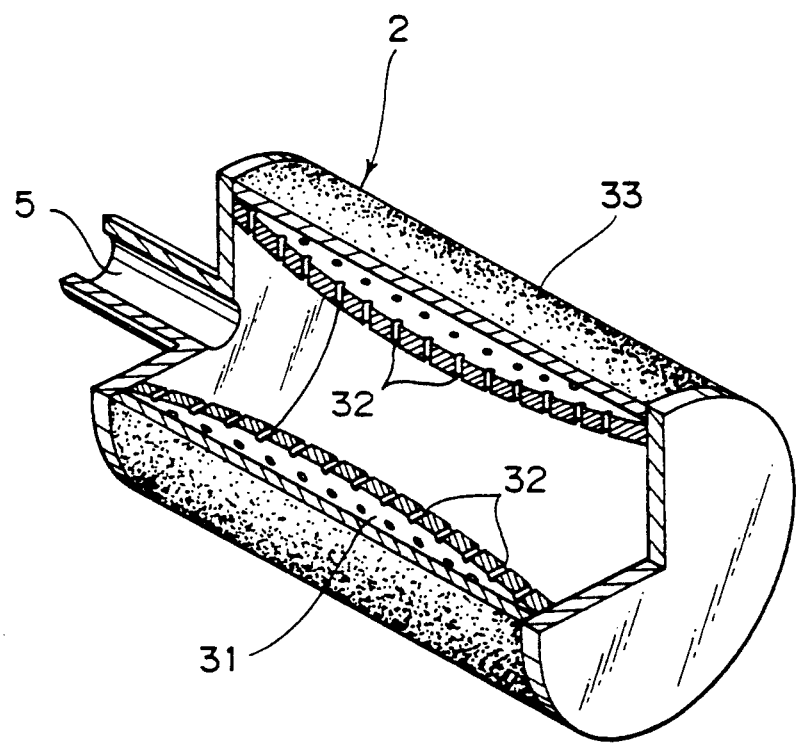
FIG. 8 is a partially cutaway perspective view of a filter drum of another embodiment.

FIG. 8 shows another preferred embodiment of the support inner barrel 31 of the filter drum 2, wherein the inner support barrel has a smaller diameter at its center portion than at its end portion. This smaller diameter in the center portion provides larger expansion of the elastic outer barrel 33 due to the pressure reduction. For example, most effective peeling of the precoated layer was achieved by a combination of an outer barrel made of a 5 mm thickness porous rubber and an inner support barrel which was 400 mm in length, with a 300 mm diameter at the end and 298 mm diameter at the center.

Now an example of the present invention will be explained more specifically. The size of the barrel of the rotary drum was $\phi 300 \times L450$ mm and the barrel was made of stainless steel (JIS SUS 304) with a 2 mm thickness and many small holes ($\phi 3$ mm, opening area rate 50-60%). The designed process capacity was 600 l/min. Outside of this inner support barrel, filter cloth made of felt (pore size: 5-30$\mu$, thickness: 4 mm, manufacturer: Shikishima Canvas Co., product's code: FT2508) was wound in double with its raised surface inside. On the outer surface of this filter cloth, diatomaceous earth (particle size distribution: 20-300$\mu$, mean size: 80$\mu$) was coated to form a precoated layer with a 15 mm thickness. A suspension of grinding fluid including sludge of ceramic, metal and cemented carbide chips was supplied for 10 minutes at a rate of 600 l/min. Sludge of particles larger than about 1 $\mu$m formed a filter cake layer. At this moment, the pressure of the suspension supply reached 1.5 kg/cm$^2$ and the pressure difference through the filter medium reached 1.0 kg/cm$^2$. Then, the supply pressure was rapidly reduced at a rate of 0.3 kg/cm$^2$.second by decreasing the opening of the suspension supply valve. After 3 seconds the supply pressure was reduced to 0.6 kg/cm$^2$.

At this moment the scrape blade scraped the expanded filter cake layer and the blockage was eliminated, and then, a normal filtering operation started again.

After repeating the above pressure reduction operation of suspension supply ten times, the scrape blade was fed by 1 mm to the center direction of the filter drum and the outer blocked surface of the precoated layer was scraped. After this scrape blade feeding operation was done 10 times, the next precoating operation was carried out. As a result, it was proved that 1000 minutes of continuous operation of the filter is possible with one processing. This result is 5 times longer than that of the conventional method, which comprises only the scrape blade's feed operation.

As described above, according to the filter cake scraping method of the present invention, when a cake layer deposited on a filter drum becomes thick, the pressure in the suspension vessel is rapidly decreased to expand the cake layer and the cake is scraped off with the scrape blade located beside the filter drum. Therefore, even when the particles of the cake are minute, the cake layer can smoothly be scraped off.

According to the rotary drum type filter of the present invention, in accordance with the measurement of the pressure in the suspension vessel, the controller automatically executes the filter cake scraping described above, thus permitting filtration to be always performed in favorable conditions.

According to an aspect of the present invention, since not only the filter cake layer but also the filter drum itself can expand as the pressure drops due to the provision of the filter drum comprising a fluid permeable inner support barrel and an elastic porous outer barrel which is fitted on the outer surface of the inner support barrel, a larger thickness of the filter cake layer can be scraped by a scrape blade. As a result, filtering time in a filtering cycle becomes longer and thus higher filtering efficiency can be accomplished.

Further longer filtering time can be achieved by the use of felt sheets having a raised surface on one side as described in a preferred embodiment due to the enlarged expansion at the time of pressure reduction and the enlarged thickness of the scraped precoated layer. A more preferable result can be obtained from another preferred embodiment wherein the fluid permeable inner support barrel has a smaller diameter in its center portion than its end portion.

Overcoming the conventional problems, the contribution of the present invention to the concerned field is therefore significant.

The advantageous effect of the present invention is summarized as follows:

① The filter cake layer can be scraped easily and with small power since that layer is scraped under an expanded and loose condition.

② The wear of the scrape blade is reduced.

③ The power of the motors for feeding the scrape blade and for rotating the drum is reduced, and accordingly, a reduced cost and sizing of the filter equipment can be accomplished.

④ The filtering time with 1 precoat operation is extended due to the saving of the precoated layer.

⑤ The operating cost of the filter is reduced because of the saving of the precoat material consumption.

What is claimed is:

1. A method of scraping a filter cake layer that forms on a rotary drum filter, as the rotary drum filter filters a fluid suspension having matter therein that is to be filtered from the fluid suspension, said rotary drum filter including a rotary drum having an outer surface, a filter medium layer formed on the outer surface of the rotary drum and a scraper disposed outside and in the vicinity of the filter medium layer, said method comprising the steps of:
   (a) providing an above-atmospheric pressure to the fluid suspension at a fluid suspension input side of the filter medium layer;
   (b) expanding the filter cake layer that forms on the rotary drum filter, in a radially outward direction of the rotary drum by rapidly reducing a pressure difference between the fluid suspension input side and a fluid output filtrate side of the filter medium layer, before a scraping operation and upon the occurrence of one of the following events:
      i) when the filter cake layer formed on the filter medium layer becomes thick; and
      ii) when a filtration pressure loss reaches a predetermined value due to a blocking of at least one of the filter medium layer and the filter cake layer; and
   (c) subsequently scraping a portion of the filter cake layer which comes into contact with the scraper when the filter cake layer expands in the radially outward direction of the rotary drum.

2. The method according to claim 1, further comprising fixing a position of the scraper.

3. A method of scraping at least one of a filter cake layer and a precoated layer from a rotary drum precoat filter, said rotary drum precoat filter filtering a fluid suspension having matter therein that is to be filtered from the fluid suspension by said rotary drum precoat filter, said rotary drum precoat filter including a rotary drum having an outer surface, a filter medium layer including a precoated layer of filter aid formed on the outer surface of the rotary drum and a scraper disposed outside and in the vicinity of the filter medium layer, said method comprising the steps of:
   (a) providing an above-atmospheric pressure to the fluid suspension at a fluid suspension input side of the filter medium layer;
   (b) expanding at least one of the filter cake layer and the precoated layer that forms on the rotary drum precoat filter as the fluid suspension is being filtered, in a radially outward direction of the rotary drum by rapidly reducing a pressure difference between the fluid suspension input side and a fluid output filtrate side of the filter medium layer, before a scraping operation and upon the occurrence of one of the following events:
      i) when the at least one of the precoated layer and the filter cake layer formed on the filter medium layer becomes thick; and
      ii) when a filtration pressure loss reaches a predetermined value due to a blocking of at least one of the filter medium layer and the filter cake layer; and
   (c) subsequently scraping a portion of at least one of the filter cake layer and the precoated layer which has come into contact with the scraper when the at least one of the filter cake layer and the precoated layer expands in the radially outward direction of the rotary drum.

4. A method according to claim 1 or 3, wherein the step of rapidly reducing the pressure difference between the fluid suspension input side and the fluid output filtrate side of the filter medium layer includes the step of reducing the above-atmospheric pressure of the fluid suspension input side at a rate of at least 0.3 kgf/cm$^2$.second.

5. A method according to claim 4, wherein the fluid suspension provided at said fluid suspension input side includes at least one of a grinding fluid and a cutting fluid which respectively contain hard particles.

6. A method according to claim 1 or 3, wherein the step of rapidly reducing the pressure difference between the fluid suspension input side and the fluid output filtrate side of the filter medium layer includes a step of raising a pressure of the fluid output filtrate side at a rate of at least 0.3 kgf/cm$^2$.second.

7. A method according to claim 6, wherein the fluid suspension provided at said fluid suspension input side includes at least one of a grinding fluid and a cutting fluid which respectively contain hard particles.

8. A method according to claim 1 or 3, wherein the step of rapidly reducing the pressure difference between a fluid suspension input side and a fluid output filtrate side of the filter medium layer includes the steps of reducing the above-atmospheric pressure of the fluid suspension input side and raising a pressure of the fluid output filtrate side, such that a rate of reduction of the pressure difference between the fluid suspension input side and the fluid output filtrate side of at least 0.3 kgf/cm$^2$.second is effected.

9. A method according to claim 8, wherein the fluid suspension provided at said fluid suspension input side includes at least one of a grinding fluid and a cutting fluid which respectively contain hard particles.

10. A method according to any one of claims 1 and 3, wherein the fluid suspension provided at said fluid suspension input side, includes at least one of a grinding fluid and a cutting fluid which respectively contain hard particles.

11. The method according to claim 3, further comprising fixing a position of the scraper.

12. A method of scraping a filter cake layer that is formed on a filter drum as the filter drum filters a fluid suspension having matter therein that is to be filtered from the fluid suspension, said filter drum being provided in a suspension vessel, comprising the steps of:
   providing an above-atmospheric pressure to the fluid suspension at a fluid suspension input side of the filter drum;
   rapidly reducing internal pressure of the suspension vessel to expand the filter cake layer when the filter cake layer deposited on the filter drum provided in the suspension vessel becomes thick; and then
   scraping the expanded filter cake layer with a scrape blade provided adjacent the filter drum.

13. The method according to claim 12, further comprising fixing a position of the scrape blade.

14. A rotary drum filter for filtration of a fluid suspension, as the rotary drum filter filters the fluid suspension having matter therein that is to be filtered, said rotary drum filter, comprising:
   a rotary drum having an outer surface;
   a filter medium layer formed on the outer surface of the rotary drum;
   a scraper disposed outside of the filter medium layer;
   pressure means for providing an above-atmospheric pressure to the fluid suspension at a fluid suspension input side of the filter medium layer; and
   control means, coupled to said pressure means, for rapidly reducing a pressure difference between the fluid suspension input side and a fluid output filtrate side of the filter medium layer upon the occurrence of one of the following events: when a filter cake layer formed on the filter medium layer as the filter medium layer filters the fluid suspension, becomes thick and when a filtration pressure loss reaches a predetermined value due to a blocking of at least one of the filter medium layer and the filter cake layer so as to expand the filter cake layer in a radially outward direction of the rotary drum; and
   means for controlling a scraping of a portion of the filter cake layer which comes into contact with the scraper when the filter cake layer expands in the radially outward direction of the rotary drum.

15. A rotary drum filter according to claim 14, wherein the control means includes means for rapidly reducing the pressure difference between the fluid suspension input side and the fluid output filtrate side of the filter medium layer by reducing the above-atmospheric pressure of the fluid suspension input side at a rate of at least 0.3 kgf/cm$^2$.second.

16. A rotary drum filter according to claim 14, wherein the control means includes means for rapidly reducing the pressure difference between the fluid suspension input side and the fluid output filtrate side of the filter medium layer by raising a pressure of the fluid output filtrate side at a rate of at least 0.3 kgf/cm$^3$.second.

17. A rotary drum filter according to claim 14, wherein the control means includes means for rapidly reducing the pressure difference between the fluid suspension input side and the fluid output filtrate side of the filter medium layer by reducing the above-atmospheric pressure of the fluid suspension input side and by raising a pressure of the fluid output filtrate side, such that a rate of reduction of the pressure difference between the fluid suspension input side and the fluid output filtrate side is at least 0.3 kgf/cm$^2$.second.

18. A rotary drum filter according to any one of claims 14, 15, 16 and 14, wherein the fluid suspension provided at said fluid suspension input side, includes at least one of a grinding fluid and a cutting fluid which respectively contain hard particles.

19. The filter according to claim 14, where a position of the scraper is fixed.

20. A rotary drum precoat filter for filtration of a fluid suspension as the rotary drum precoat filter filters the fluid suspension, said fluid suspension having matter therein that is to be filtered from the fluid suspension, said rotary drum precoat filter, comprising:
   a rotary drum having an outer surface;
   a filter medium layer including a precoated layer of filter aid formed on the outer surface of the rotary drum;
   a scraper disposed outside of the filter medium layer;
   pressure means for providing an above-atmospheric pressure to the fluid suspension at a fluid suspension input side of the filter medium layer; and
   control means, coupled to said pressure means, for rapidly reducing a pressure difference between the suspension input side and a fluid output filtrate side of the filter medium layer upon the occurrence of one of the following events: when a filter cake layer formed on the filter medium layer becomes thick and when a filtration pressure loss reaches a predetermined value due to blocking of at least one of the filter medium layer and the filter cake layer so as to expand at least one of the filter cake layer and the precoated layer in a radially outward direction of the rotary drum; and
   means for controlling scraping of a portion of at least one of the filter cake layer and the precoated layer which has come into contact with the scraper when said at least one of the filter cake layer and the precoated layer expands in the radially outward direction of the rotary drum.

21. The filter according to claim 20, where a position of the scraper is fixed.

22. A rotary drum precoat filter according to claim 20, wherein the control means includes means for rapidly reducing the pressure difference between the fluid suspension input side and the fluid output filtrate side of the filter medium layer by reducing the above-atmospheric pressure of the fluid suspension input side and by raising a pressure of the fluid output filtrate side, such that a rate of reduction of the pressure difference between the fluid suspension input side and the fluid output filtrate side is at least 0.3 kgf/cm$^2$.second.

23. A rotary drum precoat filter according to claim 20, wherein the control means includes means for rapidly reducing the pressure difference between the fluid suspension input side and the fluid output filtrate side of the filter medium layer by reducing the above-atmospheric pressure of the fluid suspension input side at a rate of at least 0.3 kgf/cm$^2$.second.

24. A rotary drum precoat filter according to claim 20, wherein the control means includes means for rapidly reducing the pressure difference between the fluid suspension input side and the fluid output filtrate side of the filter medium layer by raising a pressure of the fluid output filtrate side at a rate of at least 0.3 kgf/cm$^2$.second.

25. A rotary drum precoat filter according to any one of claims 20, 23 and 24, wherein the fluid suspension provided at said fluid suspension input side includes at least one of a grinding fluid and a cutting fluid which respectively contain hard particles.

26. A rotary drum filter for filtering matter included in a fluid suspension, said rotary drum filter having a rotary filter drum retained in a suspension vessel, comprising:
 (a) means for providing an above-atmospheric pressure to the fluid suspension at a fluid suspension input side of the rotary filter drum;
 (b) control means for rapidly dropping pressure inside the suspension vessel at a time when the pressure inside the suspension vessel rises above a predetermined value; and
 (c) scrape blade means, provided beside the rotary filter drum, for scraping a filter cake layer formed on the rotary filter drum as the rotary filter drum filters the matter out of the fluid suspension, the filter cake layer expanding as said pressure is dropped inside the suspension vessel.

27. A rotary drum filter according to claim 26, wherein the filter drum is made of an elastic porous material.

28. The filter according to claim 26, where a position of the scrape blade means is fixed.

29. A precoat filter for filtering matter out of a suspension fluid comprising:
 a rotary filter drum having a layer of precoated filter material formed thereon, the rotary filter drum being retained in a suspension vessel, the rotary filter drum including a fluid permeable inner support barrel and an elastic porous outer barrel which is fitted on the outer surface of the inner support barrel;
 (a) means for providing an above-atmospheric pressure to the fluid suspension at a fluid suspension input side of the layer of precoated filter material;
 (b) control means for rapidly dropping pressure inside the suspension vessel at a time when the pressure rises above a predetermined value; and
 scrape blade means, provided beside the filter drum, for scraping a filter cake layer that forms on the rotary filter drum as the suspension fluid is filtered, the filter cake layer expanding when the control means rapidly drops pressure in the suspension vessel.

30. A precoat filter according to claim 29, wherein the outer barrel comprises at least one felt sheet, with one side thereof including a raised surface.

31. A precoat filter according to claim 29, wherein the fluid permeable inner support barrel has a hourglass shape with a center portion and an end portion, with said center portion having a smaller diameter than said end portion.

32. The filter according to claim 29, wherein a portion of the scrape blade means is fixed.

* * * * *